(12) United States Patent
Andersen et al.

(10) Patent No.: US 11,892,005 B2
(45) Date of Patent: Feb. 6, 2024

(54) HYDRAULIC MACHINE

(71) Applicant: Danfoss A/S, Nordborg (DK)

(72) Inventors: Stig Kildegaard Andersen, Krusaa (DK); Poul Erik Hansen, Aabenraa (DK); Achuthan Babu, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/832,797

(22) Filed: Jun. 6, 2022

(65) Prior Publication Data
US 2023/0080903 A1    Mar. 16, 2023

(30) Foreign Application Priority Data
Sep. 16, 2021  (EP) ..................... 21197094

(51) Int. Cl.
| | | |
|---|---|---|
| *F04D 29/04* | (2006.01) | |
| *F04D 29/08* | (2006.01) | |
| *F04D 29/046* | (2006.01) | |
| *F16J 15/20* | (2006.01) | |
| *B33Y 80/00* | (2015.01) | |

(52) U.S. Cl.
CPC ....... *F04D 29/0465* (2013.01); *F04D 29/086* (2013.01); *F16J 15/20* (2013.01); *B33Y 80/00* (2014.12)

(58) Field of Classification Search
CPC .......................... F04D 29/0465; F04D 29/086
See application file for complete search history.

(56) References Cited

U.S. PATENT DOCUMENTS

| | | | | |
|---|---|---|---|---|
| 3,582,090 A | * | 6/1971 | Lott .................... | F04B 9/117 |
| | | | | 277/408 |
| 5,573,380 A | * | 11/1996 | Martensen ............ | F04B 1/2021 |
| | | | | 91/499 |
| 5,890,412 A | * | 4/1999 | Martensen ............ | F04B 1/2042 |
| | | | | 91/499 |
| 10,094,364 B2 | * | 10/2018 | MacHarg .............. | F04B 1/2028 |
| 2007/0022873 A1 | * | 2/2007 | Sund .................... | F04B 1/2042 |
| | | | | 92/71 |
| 2018/0209409 A1 | * | 7/2018 | Liao ..................... | F04B 43/028 |
| 2018/0209411 A1 | * | 7/2018 | Chen .................... | F04B 17/003 |

* cited by examiner

*Primary Examiner* — Long T Tran
(74) *Attorney, Agent, or Firm* — McCormick, Paulding & Huber PLLC

(57) ABSTRACT

A hydraulic machine includes a first member (1) having a first structure (2) for a hydraulic medium opening in a first interface surface (3) and a second member having a second structure for the hydraulic medium opening in a second interface surface is described, the first interface surface (3) being in contact with the second interface surface, wherein at least one of the members (1) is provided with a support element (6) surrounding the member (1). Such a machine should have a good efficiency. To this end the support element (6) has a strength varying in circumferential direction around the member (1) and/or in thickness direction in a middle region of the member (1).

19 Claims, 4 Drawing Sheets

HYDRAULIC MACHINE

CROSS-REFERENCE TO RELATED APPLICATION

This application claims foreign priority benefits under U.S.C. § 119 from European Patent Application No. 21197094.2, filed Sep. 16, 2021, the content of which is hereby incorporated by reference in its entirety.

TECHNICAL FIELD

The present invention relates to a hydraulic machine comprising a first member having a first structure for a hydraulic medium opening in a first interface surface and a second member having a second structure for the hydraulic medium opening in a second interface surface, the first interface surface being in contact with the second interface surface, wherein at least one of the members is provided with a support element surrounding the member.

BACKGROUND

In the following a pressure exchanger or energy recovery device is used as an example for such a hydraulic machine. However, the invention is not limited to this example, but is applicable to any part of hydraulic machines in which there is contact between two interface surfaces having openings and which are used for transferring hydraulic medium from one member to another one. The contact can be a sliding or non-sliding contact.

When the two interface surfaces are in contact, it is important that the flatness of these sealing interface surfaces is good. In an energy recovery device, a port flange cooperates with a valve plate. The port flange is pressed against the valve plate. This creates the necessary seal between the port flange and the valve plate. Depending on the pressure in the structure for the hydraulic medium, the port flange or the valve plate, respectively, will deform. This will increase the leakage from the valve system and reduce the efficiency of the hydraulic machine.

It is known, for example, from U.S. Pat. No. 10,094,364 B to use a support element in form of a compression ring. The compression ring can have, at one or both ends, a rim or flange projecting radially from an edge of the band. However, such a compression ring does not overcome the problem of leakage.

SUMMARY

The problem underlying the invention is to specify a hydraulic machine having a good efficiency.

This object is solved with a hydraulic machine as described at the outset in that the support element comprises a strength varying in circumferential direction around the member and/or in thickness direction in a middle region of the member.

The term "strength" is an abbreviation for the forces with which the support element acts on the member. These forces now can vary over the circumference of the member and/or over the thickness of the member. This variation in the thickness is not limited to the edge parts, but varies over at least a part of the member in a middle region.

In an embodiment of the invention the strength of the support element varies depending on the resistance against deformation of the member. In many cases the structure for the hydraulic medium does not run exclusively parallel to a central axis of the member, but runs under an angle. This means, that in a thickness direction of the member there are parts having a larger resistance against a radial deformation and parts having a smaller resistance against deformation. Thus, the support element can be adapted to the different resistances against deformation.

In an embodiment of the invention the shape of the cross section of the support element varies in circumferential direction around the member and/or in thickness direction in a middle region of the member. Thus, the strength can be varied by varying the shape.

In an embodiment of the invention the support element is in form of a compression ring connected to the member with an interference fit, wherein the interference fit varies in circumferential direction around the member and/or in thickness direction in a middle region of the member. The strength can also be influenced by the force of the interference fit.

In an embodiment of the invention the structure for the hydraulic medium of the member comprises a first asymmetry and the support element comprises a second asymmetry compensating for the first asymmetry. The first asymmetry results in different resistances against deformation. These differences are at least partly compensated by the second asymmetry.

In an embodiment of the invention the member comprises a first outer form and the support element comprises a second outer form, wherein a distance between the first outer form and the second outer form varies in circumferential direction around the member and/or in thickness direction in a middle region of the member. This means that the support element can be thinner or thicker in certain regions.

In an embodiment of the invention the support element comprises a contact face adjacent the member, wherein at least a part of the contact face in circumferential direction around the member and/or in thickness direction of the member forms a gap to the member. When the support element forms a gap with the member, there is no compression force in the area of the gap. A compression force is only generated by the support element, when the support element contacts the member.

In an embodiment of the invention the material of the member is different from the material of the support element. The material of the member can be chosen with respect to sealing performance or other characteristics of the hydraulic machine.

In an embodiment of the invention the member is of a ceramic material. When the contact is in a sliding contact, a ceramic material can be used for this sliding contact with another element with low friction.

In an embodiment of the invention the member is of a plastic material. The plastic material can likewise be used for a low friction when the contact is a sliding contact.

In an embodiment of the invention the support element is of stainless steel. Stainless steel can produce the necessary strength, i.e. the necessary forces to prevent a deformation of the member.

In an embodiment of the invention the coefficient of thermal expansion of the member and of the support element differs no more than 10%. The coefficient of thermal expansion for the materials of the member and of the support element should be close to each other.

In an embodiment of the invention the support element protrudes at least partly over the member at least in a part of the circumference of the member. In other words, the support element can be "higher" than the member.

In an embodiment of the invention the interface surface is uneven without hydraulic pressure in a high-pressure part of the structure for the hydraulic medium and even with hydraulic pressure in the high-pressure part of the structure for the hydraulic medium. In other words, the support element recompensates for the compensation produced by the hydraulic medium in the high-pressure part of the structure.

BRIEF DESCRIPTION OF THE DRAWINGS

Preferred embodiments of the invention will now be described with reference to the drawing, in which.

DETAILED DESCRIPTION

Figure 1:
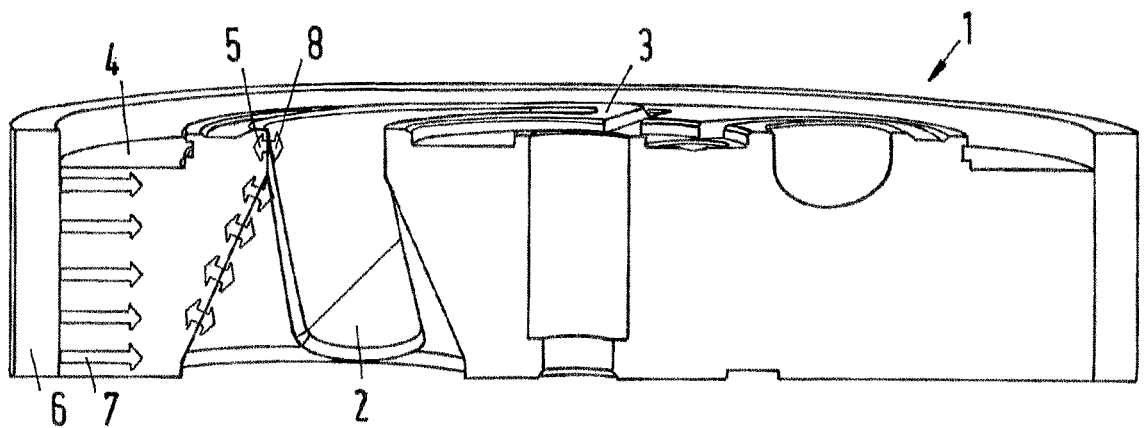
FIG. 1 is a schematic illustration showing forces acting in a member.

FIG. 1 shows schematically a first member 1 of a hydraulic machine having a high-pressure channel 2 as a first structure for a hydraulic medium. The high-pressure channel 2 opens in a first interface surface 3. The first interface surface 3 forms a sealing surface with which the member 1 rests against a second member of the hydraulic machine which is not shown. The second member comprises likewise a second structure for the hydraulic medium which opens in a second interface surface which contacts the sealing surface 3. The contact between the two surfaces can be a static contact, i.e. a non-sliding contact, or it can be a sliding contact.

The port plate 1 comprises a port flange 4. During operation of the hydraulic machine the port plate 1 rotates in relation to the second member, for example the valve plate.

A number of arrows 5 shows possible deformations of the port flange 4 caused by the pressure of the hydraulic medium in the high-pressure channel 2 and the forces generated by these pressures.

In order to avoid these deformations, a support element 6, for example in form of a compression ring, is used. Arrows 7 show forces produced by the support element 6 and arrows 8 show deformations produced by these forces 7, i.e. by the forces produced by the support element 6. In an ideal situation, the deformations 5 produced by the high pressure in the high-pressure channel 2 and the deformations 8 produced by the support element 6 are equal in opposite directions and cancel each other out, so that the flatness of the sealing surface 3 can be maintained.

However, the port flange 4 does not deform uniformly, but unevenly depending on its geometry.

To take into account this uneven deformation, the support element 6 produces forces counteracting the deformations produced by the high pressure of the hydraulic medium which are also unevenly distributed. These forces are briefly termed "strength". This strength of the support element 6 varies in the circumferential direction around the member 1. Alternatively or additionally, this strength can vary in the thickness direction, in particular in a middle region of the member 1, i.e. the variation of the strength of the support member 6 is not limited to its edges.

This is schematically shown in FIG. 2. FIG. 2 shows a cross section through a part of the port flange 4 and a part of the support element 6.

Figure 2A:
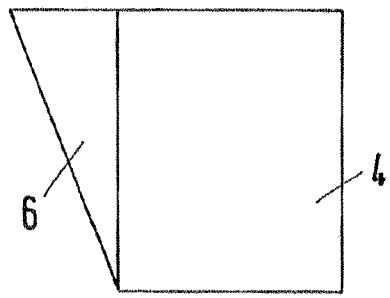
FIGS. 2a and 2b show sectional views through a part of the support element and a part of the member.

In FIG. 2a a support element 6 has a cross section in form of a tri-angle. The radial extension of the support element 6 increases from the lower end of the support element 6 to the upper end of the support element 6 (as shown in FIG. 1). In other words, the thickness of the support element 6 is largest in the region of the sealing surface 3, so that the resistance against deformation of the port flange 4 in a region of the sealing surface 3 can be minimized.

Figure 2B:
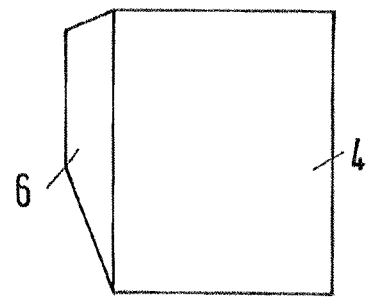

FIG. 2b shows an alternative cross section of the support element 6. Here, the radial extension of the support element 6 increases from the bottom to approximately the middle of the thickness of the port flange 4 and is then constant short before the upper end of the port flange 4. Then the radial extension of the support element 6 slightly decreases.

This means that the strength of the support element 6 is highest in the "upper half" of the port flange (as shown in FIG. 2b).

Figure 3A:
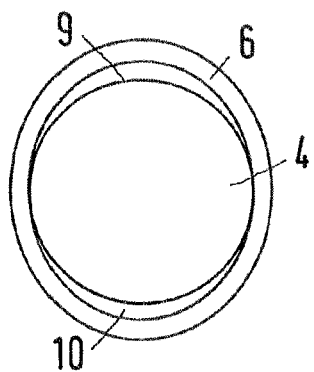
FIGS. 3a and 3b show schematically plan views of the member and the support element.

FIG. 3 schematically shows in a top view the port flange surrounded by the support element 6. It can be seen, that the port flange 4 is of circular form, while the support element 6 is of elliptic form. Thus, there are two gaps 9, 10 between the port flange and the support element 6. In these gaps 9, 10 there are no compression forces produced by the support element 6 acting on the port flange 4.

Figure 3B:
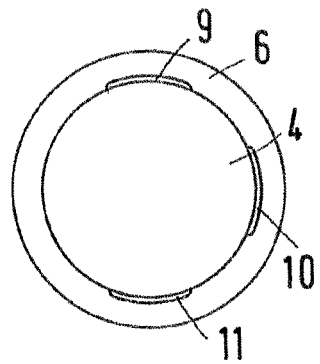

FIG. 3b shows an embodiment in which the port flange 4 is of circular form and the support element 6 is in form of a ring having an outer contour which is also of circular form. The inner contour of the support element 6 is also of circular form. However, there are three gaps 9, 10, 11 between the port flange 4 and the support element 6 in which no compression forces are produced.

Figure 4A:
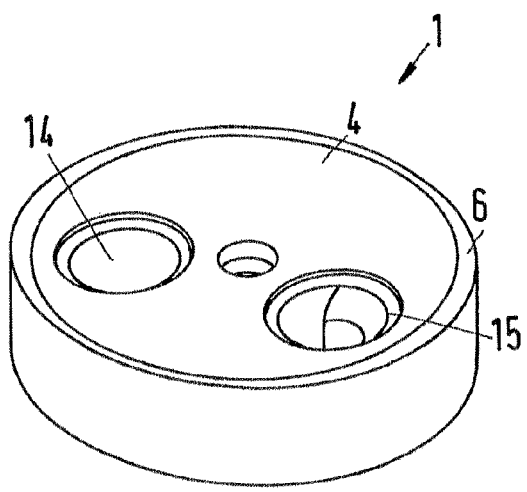
FIGS. 4a, 4b and 4c show a first embodiment of a member.
Figure 4B:
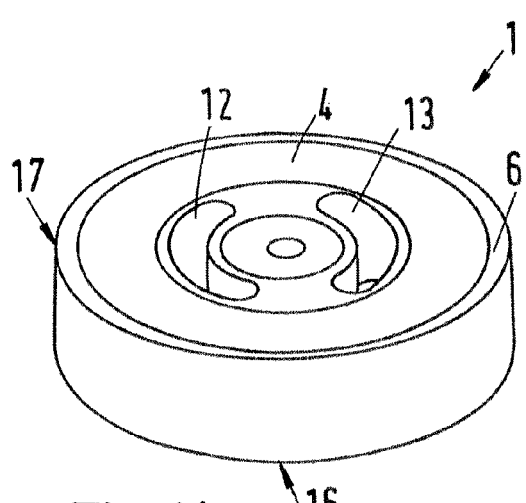
Figure 4C:
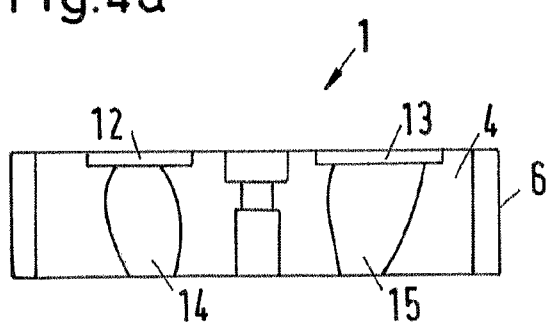

FIG. 4 shows an embodiment of the member 1, wherein FIG. 4a shows the member 1 from one side, FIG. 4b shows the member 1 from the opposite side and FIG. 4c shows a sectional view through a middle plane of the member 1.

The port flange 4 comprises two kidney-shaped openings 12, 13 which are connected with inlet and outlet openings 14, 15, respectively. The inlet and outlet openings 14, 15 can be connected, for example, with cylinders. The support element 6 is in form of a compression ring. The shape of the support element 6 varies in circumferential direction. In this case, the port flange 4 comprises a first outer form which is circular and the support element 6 comprises a second outer form, which is not circular. A distance between the outer form of the port flange and the outer form of the support element 6 varies in circumferential direction. In other words, there are sections 16 in which the support element 6 is thinner, and sections 17, in which the support element 6 is thicker (all in radial direction). This means that the support element 6 has a strength which is larger in the regions 17 than in the regions 16.

Figure 5A:
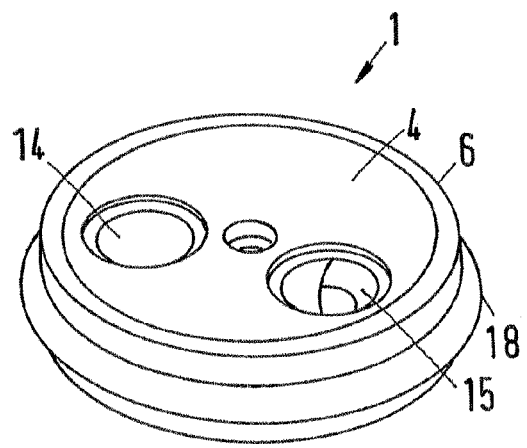
FIGS. 5a, 5b and 5c show a second embodiment of a member.
Figure 5B:
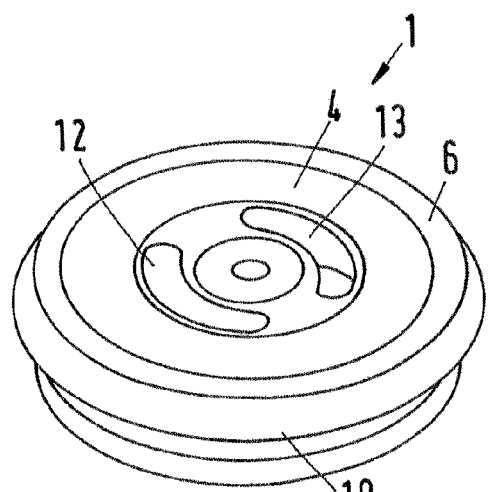
Figure 5C:
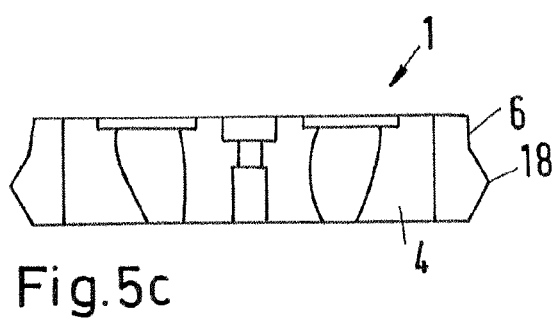

FIG. 5 shows another embodiment in which the port flange 4 is surrounded by the support element 6. Again, FIG. 5a shows the member 1 from one side, FIG. 5b shows the member from the other side, and FIG. 5c shows a sectional view. The support element 6 has a varying shape in the thickness direction of the member 1. The variation of the radial extension of the support element 6 is prominent in a middle part 18 of the thickness of the support element 6. This means, that the strength of the support element 6 is highest in the middle part of the thickness of the member 1.

Figure 6A:
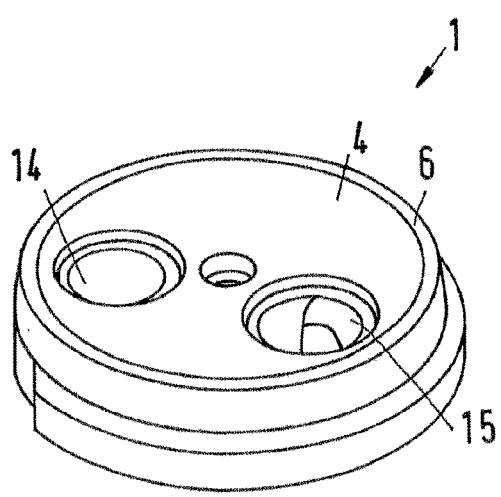
FIGS. 6a, 6b and 6c show a third embodiment of a member.
Figure 6B:
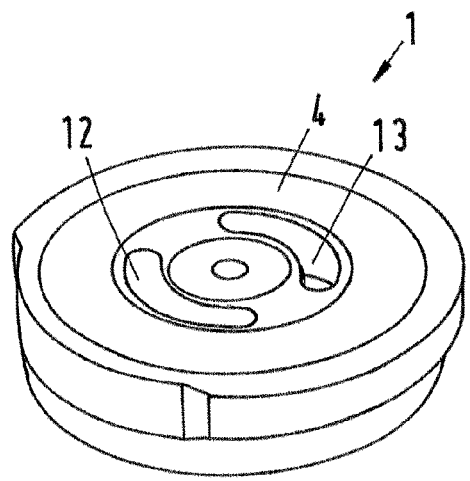
Figure 6C:
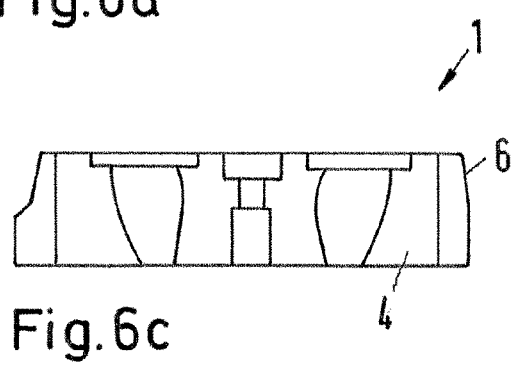

FIG. 6 shows an embodiment of the invention in which the support element is again in form of a compression ring. Again, FIG. 6a shows member 1 from one side, FIG. 6b shows the member 1 from the other side, and FIG. 6c shows a sectional view. The support element 6 has a strength varying in the circumferential direction around the port flange and in the thickness direction of the port flange 4 between the two edges of the port plate 1.

Figure 7A:
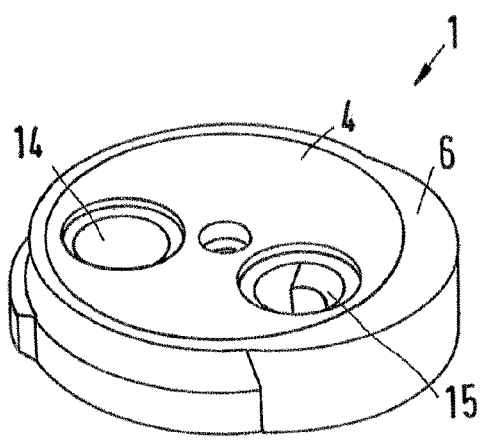
FIGS. 7a, 7b and 7c show a fourth embodiment of a member.
Figure 7B:
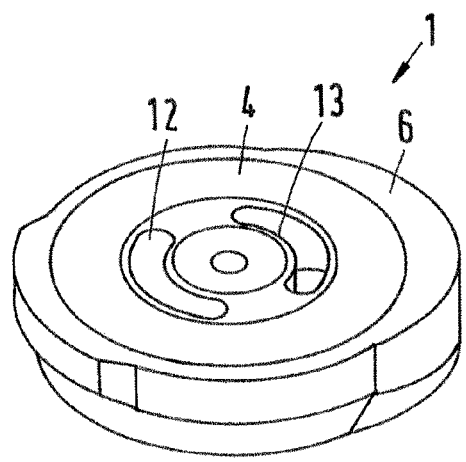
Figure 7C:
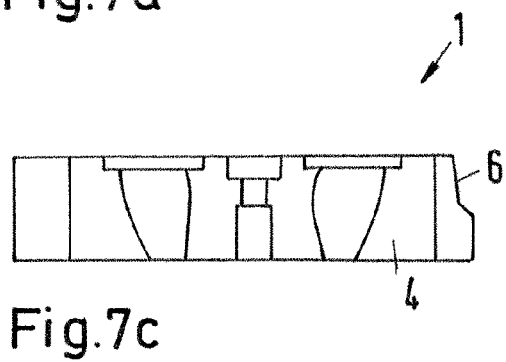

Another embodiment of the invention is shown in FIG. 7, in which the support element 6 again has two regions in the circumferential direction which are in the side of the kidney-shaped openings 12, 13 larger in the radial extension. Again, FIG. 7a shows the member 1 from one side, FIG. 7b shows the member 1 from the other side, and FIG. 7c shows a sectional view. However, the larger radial extension is limited to only the half of the thickness of the port flange 41 in which the kidney-shaped openings 12, 13 are arranged.

Figure 8A:
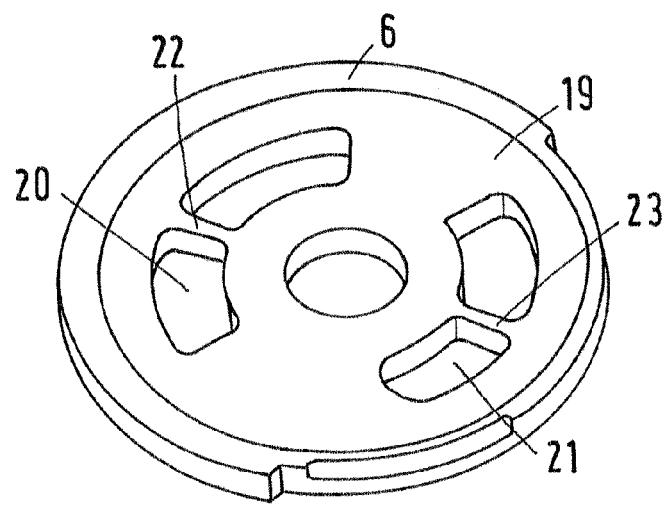
FIGS. 8a and 8b show another member of a hydraulic machine.

FIG. 8 shows a second member of the hydraulic machine in form of a valve plate 19 having kidney-shaped openings 20, 21. A rib 22, 23 has been introduced in each kidney-shaped opening 20, 21 to prevent the support element 6 to damage the kidney-shaped openings 20, 21. However, when the support element 6 is provided with a varying strength, this rib 22, 23 can be omitted.

Again, the support element 6 shows a radial extension which varies in circumferential direction and in the thickness direction of the valve plate 19.

Figure 8B:
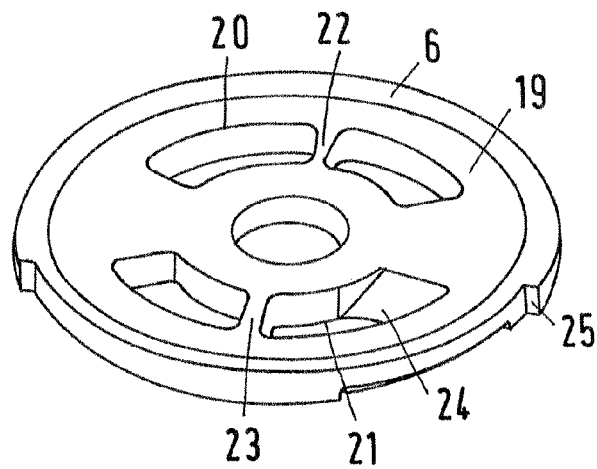

As can be seen in FIG. 8b, the valve plate 19 comprises a first asymmetry 24 and the support element 6 comprises a second asymmetry 25. The second asymmetry 25 compensates for the first asymmetry 24.

The port flange 4 and the support element 6 can be of different materials. The same is true for the valve plate 19 and the support element 6. The valve plate 19 and/or the port flange 4 can be of a plastic material or of a ceramic material. The support element 6 can be of steel, in particular stainless steel.

The support element 6 can be produced by 3D-printing.

The coefficient of thermal expansion of the support element 6 and the port flange 4 or the valve plate 19, respectively, should be close to each other. In other words, the coefficient of thermal expansion of the port flange, the valve plate 19 and the support element 6 differs no more than 10%.

The support element 6 can protrude at least partially over the port flange 4 or valve plate 19, at least in a part of the circumference of the port plate 1 or the valve plate 19, respectively.

It is possible to make the sealing surface 3 uneven in a condition where there is no hydraulic pressure in the high-pressure channel 2, i.e. the forces produced by the support element 6 lead to a deformation of the sealing surface 3. This deformation is compensated for when the hydraulic pressure in the high-pressure channel 2 increases, so that, for example, at a pressure of 80 bars, the required flatness is achieved.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A hydraulic machine comprising a first member having a first structure for a hydraulic medium opening in a first interface surface and a second member having a second structure for the hydraulic medium opening in a second interface surface, the first interface surface being in contact with the second interface surface, wherein at least one of the members is provided with a support element surrounding the member, wherein the support element comprises a strength varying in circumferential direction around the member and/or in thickness direction in a middle region of the member, and wherein, when the support element comprises a strength varying in thickness direction, the strength of the support element varies depending on the resistance against deformation of the member in a direction parallel to its interface surface such that in a thickness direction of the support member there are parts of the support member configured to provide a larger resistance against a radial deformation than other parts of the support member in the thickness direction which are configured to provide a smaller resistance against a radial deformation.

2. The hydraulic machine according to claim 1, wherein the shape of the cross section of the support element varies in circumferential direction around the member and/or in thickness direction in a middle region of the member.

3. The hydraulic machine according to claim 1, wherein the support element is in form of a compression ring connected to the member with an interference fit, wherein the interference fit varies in circumferential direction around the member and/or in thickness direction in a middle region of the member.

4. The hydraulic machine according to claim 1, wherein the structure for the hydraulic medium of the member comprises a first asymmetry and the support element comprises a second asymmetry compensating for the first asymmetry.

5. The hydraulic machine according to claim 1, wherein the member comprises a first outer form and the support element comprises a second outer form, wherein a distance between the first outer form and the second outer form varies in circumferential direction around the member and/or in thickness direction in a middle region of the member.

6. The hydraulic machine according to claim 1, wherein the support element comprises a contact face adjacent the member, wherein at least a part of the contact face in circumferential direction around the member and/or in thickness direction of the member forms a gap to the member.

7. The hydraulic machine according to claim 1, wherein the material of the member is different from the material of the support element.

8. The hydraulic machine according to claim 7, wherein the member is of a ceramic material.

9. The hydraulic machine according to claim 7, wherein the member is of a plastic material.

10. The hydraulic machine according to claim 7, wherein the support element is of stainless steel.

11. The hydraulic machine according to claim 1, wherein the support element is 3D printed.

12. The hydraulic machine according to claim 1, wherein the coefficient of thermal expansion of the member and of the support element differs no more than 10%.

13. The hydraulic machine according to claim 1, wherein the support element protrudes at least partly over the member at least in a part of the circumference of the member.

14. The hydraulic machine according to claim 1, wherein the interface surface is uneven without hydraulic pressure in a high pressure part of the structure for the hydraulic medium and even with hydraulic pressure in the high pressure part of the structure for the hydraulic medium.

15. A hydraulic machine comprising a first member having a first structure for a hydraulic medium opening in a first interface surface and a second member having a second structure for the hydraulic medium opening in a second interface surface, the first interface surface being in contact with the second interface surface, wherein at least one of the members is provided with a support element surrounding the member, and wherein the support element comprises a strength varying in circumferential direction around the member.

16. The hydraulic machine according to claim 15, wherein the shape of the cross section of the support element varies in circumferential direction around the member.

17. A hydraulic machine comprising a first member having a first structure for a hydraulic medium opening in a first interface surface and a second member having a second structure for the hydraulic medium opening in a second interface surface, the first interface surface being in contact with the second interface surface, wherein at least one of the members is provided with a support element surrounding the member, wherein the support element comprises a strength varying in circumferential direction around the member and in thickness direction in a middle region of the member.

18. The hydraulic machine according to claim 17, wherein the shape of the cross section of the support element varies in circumferential direction around the member and in thickness direction in a middle region of the member.

19. The hydraulic machine according to claim 17, wherein the support element is in form of a compression ring connected to the member with an interference fit, wherein the interference fit varies in circumferential direction around the member and in thickness direction in a middle region of the member.

* * * * *